March 29, 1960     R. D. DODGE ET AL     2,930,463
TORQUE LIMITING CLUTCH
Filed Jan. 7, 1958

INVENTORS
RONALD D. DODGE
WALTER O. CRALLE
BY *Ralph C. Eastin*
ATTORNEY

United States Patent Office 2,930,463
Patented Mar. 29, 1960

2,930,463

TORQUE LIMITING CLUTCH

Ronald D. Dodge and Walter O. Cralle, Lexington, Ky., assignors to International Business Machines Corporation, New York, N.Y., a corporation of New York Application January 7, 1958, Serial No. 707,556

5 Claims. (Cl. 192—81)

This invention relates to clutch mechanisms, and more particularly to clutch mechanisms of the spring type.

It is desirable in some cases that a clutch mechanism be provided for positively connecting a driving member to a driven member without slippage within given load limits. Upon reaching the upper load limit, the clutch mechanism should slip to avoid a breakage of parts. Such action may be obtained by providing an intermediate member which is rotatable relative to the driving member and is connected thereto by a spring coiled about both members in the direction of rotation of the driving member. One end of this spring is fixed to the driving member, and the other end has frictional engagement with the intermediate member. A second spring may be coiled about the intermediate member and the driven member in a direction opposite to the direction of rotation of the driving member and be normally out of engagement with the driven member. By providing means for deflecting the second spring against the driven member to produce some friction between them, the spring will be caused to wind tightly due to the rotating motion and effect a positive connection of the driven member to the intermediate member.

An object of this invention is to provide an improved clutch mechanism.

Another object is to provide an improved clutch mechanism of the coiled spring type.

Still another object is to provide an improved spring clutch which is operable under a light force to connect a driven member positively to a driving member and yet permit a slipping in the drive when the load reaches an upper limit.

Other objects of the invention will be pointed out in the following description and claims and illustrated in the accompanying drawings, which disclose, by way of example, the principle of the invention and the best mode, which has been contemplated, of applying that principle.

Figure 1:
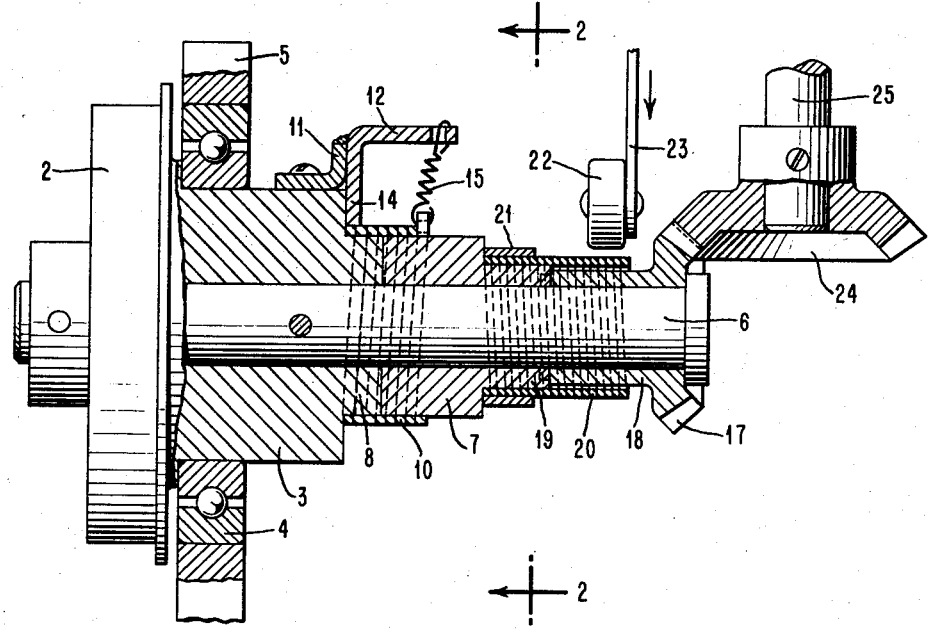
Fig. 1 is a vertical sectional view of the improved clutch mechanism.
Figure 2:
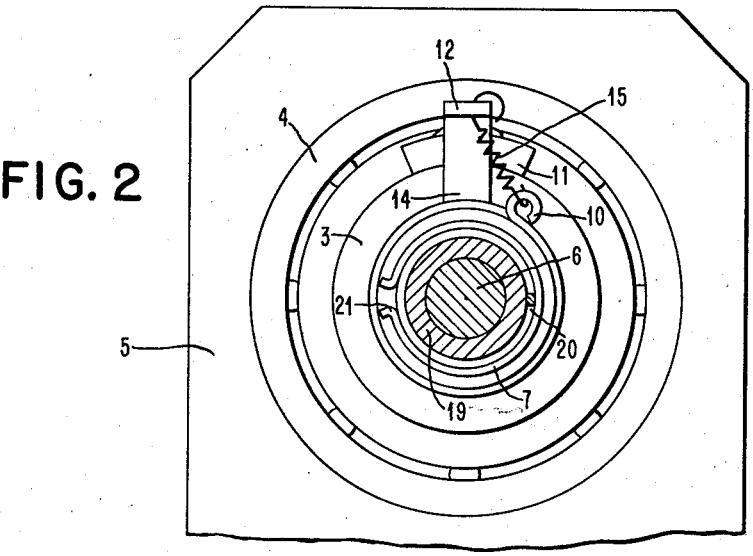
Fig. 2 is a view taken on the plane of the line 2—2 of Fig. 1.

Referring to the drawings it will be noted that there is shown in Fig. 1 a pulley 2 having a hub 3 rotatably supported by a bearing 4 mounted within an opening in a supporting plate 5. The pulley may be driven by a belt from any suitable power means, not shown, and it will be assumed herein that the pulley is driven in a clockwise direction looking from left to right. A shaft 6 extends axially through the pulley and is fixed thereto in any suitable manner.

Freely mounted upon the shaft is a sleeve shaped member 7 abutting the hub 3 and having an outside diameter equal to that of a reduced hub portion 8. Surrounding the reduced hub portion and part of the sleeve member is a spring 10 which is coiled in the direction of rotation of the hub extending from left to right. Fixed to the hub is a bracket 11 having an arm 12 extending over the sleeve member and an arm 14 bearing against the left end of the spring for clamping the latter to the reduced hub portion. The spring 10 is wound so as to have frictional engagement with the hub portion 8 and the member 7, and a spring 15 is connected between the right end of the spring 10 and the arm 12 for wrapping the spring 10 more tightly about the sleeve member to increase the frictional engagement.

A bevel gear 17 is freely mounted upon the shaft 6 and is provided with a hub portion 18 which is slightly smaller in outside diameter than a reduced portion 19 on the sleeve shaped member 7. Surrounding the reduced portion 19 and the hub 18 is a coiled spring 20 which is wound, extending from left to right, in a direction opposite to the rotation of the shaft 6. The left end of the spring 20 is clamped to the reduced portion 19 by a C-shaped spring member 21, and the right end of the spring clears the hub 18 by a small amount, as shown.

Arranged adjacent the right end of the spring 20 is a roller 22 carried by an arm 23 which may be manually actuated to engage the roller 22 with the side of the spring for deflecting it against the hub 18. The friction between the hub and the spring is sufficient to cause the latter to wind itself tightly about the hub for connecting it without slipping to the intermediate member 7. If desired, a shoe may be used in place of the roller 22 so as to provide a friction between the shoe and the spring 20 adding to the friction between the spring and the gear hub for operating the spring to effect a driving of the gear. Meshing with the gear 17 is a gear 24 fixed to a shaft 25 to which some mechanism to be driven may be connected.

With the parts in the positions shown in the drawings, the gear 17 is free on the shaft 6 so that no drive is transmitted to the shaft 25. The member 7 rotates with the shaft 6 since it is frictionally engaged by the spring 10. Upon moving the roller 22 against the spring 20 to deflect the latter into engagement with the hub 18, the friction between the hub and the coils of the spring causes the latter to wind about the hub and drive the gear 17 without slipping. The sleeve member 7 is connected to the shaft 6 only through the action of springs 10 and 15. If the resistance to rotation of the shaft 25 exceeds an upper limit, the load on the drive connections results in a rotation of pulley 2 relative to the member 7 causing the spring 10 to expand and reduce its frictional engagement with the member 7. Driving of the shaft 25 is discontinued until the load drops to a value which permits the spring 10 to regain its normal engagement with the member 7. As soon as the roller 22 is moved out of engagement with the spring 20, the gear 17 is fully released and the driving of the shaft 25 is discontinued.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A clutch mechanism for controlling the connection of a driven member to a continuously rotating driving member comprising, in combination, a rotatable element arranged between said driving member and said driven member, a first coiled spring fixed at one end to said driving member and encompassing a portion of said rotatable element, said spring being coiled about said rotatable element in the direction of rotation of said driving member and having frictional engagement with said rotatable element, a second coiled spring fixed at one end to said rotatable element and encompassing a portion of said driven member, said second spring being loosely coiled about said driven member in a direction opposite to the direction of rotation of said driving member, and means movable against the free end of said second spring for forcing the latter into frictional engagement with said driven member to effect a clutching of the latter to said driving member.

2. The mechanism of claim 1 in which said last mentioned means comprises a roller supported adjacent the free end of said second spring on an axis extending parallel to the axis of said driven member, and means for moving said roller against the turns at the free end of said spring for deflecting the latter into frictional engagement with said driven member.

3. The mechanism of claim 1 including a yielding means connected to the free end of said first coiled spring for winding the latter in a direction to increase its frictional engagement with said rotatable element.

4. A clutch controlled driving mechanism comprising, in combination, a shaft, means for rotating said shaft continuously in one direction, a sleeve shaped element loosely mounted upon said shaft, a first coiled spring encompassing at one end a portion of said sleeve shaped element, means for attaching the other end of said spring to said shaft, said spring being coiled about said sleeve shaped element in the direction of rotation of said shaft and having frictional engagement with said sleeve shaped element, a driven member mounted upon said shaft for rotation relative thereto, a second coiled spring fixed at one end to said sleeve shaped element and encompassing a portion of said driven member, said second spring being loosely coiled about said driven member in a direction opposite to the direction of rotation of said shaft, and means movable against the turns at the free end of said second spring for forcing the latter into frictional engagement with said driven member to effect a clutching of the latter to said shaft.

5. The mechanism of claim 4 including a spring connected to the free end of said first coiled spring for winding the latter in a direction to increase its frictional engagement with said sleeve shaped member.

References Cited in the file of this patent

UNITED STATES PATENTS

| | | |
|---|---|---|
| 867,324 | Warner | Oct. 1, 1907 |
| 1,561,507 | Chilton | Nov. 17, 1925 |
| 1,561,537 | Hayes | Nov. 17, 1925 |
| 1,898,139 | Nordin | Feb. 21, 1933 |
| 2,005,974 | Hutchinson | June 25, 1935 |
| 2,468,193 | Goff | Apr. 26, 1949 |
| 2,618,137 | White | Nov. 18, 1952 |
| 2,626,029 | Gutterman | Jan. 20, 1953 |
| 2,643,750 | Moulton | June 30, 1953 |

FOREIGN PATENTS

| | | |
|---|---|---|
| 728,422 | Great Britain | Apr. 20, 1955 |